US012276736B2

(12) United States Patent
Hancock

(10) Patent No.: US 12,276,736 B2
(45) Date of Patent: Apr. 15, 2025

(54) METHOD AND SYSTEM FOR TIME AUTHENTICATION

(71) Applicant: Ordnance Survey Limited, Southampton (GB)

(72) Inventor: Stephen Hancock, Southhampton (GB)

(73) Assignee: Ordnance Survey Limited, London (GB)

( * ) Notice: Subject to any disclaimer, the term of this patent is extended or adjusted under 35 U.S.C. 154(b) by 388 days.

(21) Appl. No.: 17/805,813

(22) Filed: Jun. 7, 2022

(65) Prior Publication Data
US 2022/0397681 A1 Dec. 15, 2022

(30) Foreign Application Priority Data
Jun. 9, 2021 (GB) ..................... 2108229

(51) Int. Cl.
*G01S 19/20* (2010.01)
*G01S 19/21* (2010.01)
(Continued)

(52) U.S. Cl.
CPC ............ *G01S 19/20* (2013.01); *G01S 19/215* (2013.01); *G01S 19/256* (2013.01); *G01S 19/073* (2019.08); *G01S 19/396* (2019.08)

(58) Field of Classification Search
CPC ...... G01S 19/073; G01S 19/20; G01S 19/215; G01S 19/396; G01S 19/256; H04K 3/20; H04L 63/08
(Continued)

(56) References Cited

U.S. PATENT DOCUMENTS 6,393,126 B1 * 5/2002 van der Kaay ....... H04L 63/123
713/172
8,077,086 B2 * 12/2011 Huang ................... G01S 19/23
342/357.62
(Continued)

FOREIGN PATENT DOCUMENTS

EP 2908454 A2 8/2015
GB 2550206 A 11/2017
(Continued)

OTHER PUBLICATIONS

"Precision Clock Synchronization Protocol for Networked Measurement and Control Systems," IEC 61588, Edition 3.0. Jun. 2021.
(Continued)

*Primary Examiner* — Chuong P Nguyen
(74) *Attorney, Agent, or Firm* — Banner & Witcoff, Ltd.

(57) ABSTRACT

Existing networks of precisely surveyed GNSS receivers that are used for dGNSS or RTK positioning techniques can be used to measure GNSS time across a territory or region such as a country. The measured GNSS time base signals from each receiver are then fed back to a collating service, similar to the existing dGNSS/RTK systems, which also receives an accurate time base signal from a trusted third-party time base supplier which maintains a trusted time base. The collating service then compares the GNSS time signals from the network of GNSS receivers with the trusted time base and determines whether the GNSS time signals are accurate when compared to the trusted time base, and if they are not accurate, calculates the error. The collating service may provide the calculated error to users and the necessary correction that needs to be applied to measured GNSS time to obtain accurate UTC time.

18 Claims, 2 Drawing Sheets

(51) Int. Cl.
*G01S 19/25* (2010.01)
*G01S 19/07* (2010.01)
*G01S 19/39* (2010.01)

(58) Field of Classification Search
USPC ............ 342/357.58, 357.59, 357.64, 357.22, 342/357.4
See application file for complete search history.

(56) References Cited

U.S. PATENT DOCUMENTS

| | | | |
|---|---|---|---|
| 10,459,086 B2 * | 10/2019 | Cruddace | G01S 19/03 |
| 10,466,363 B2 * | 11/2019 | Lombardi | G01S 19/235 |
| 10,690,778 B2 * | 6/2020 | Chandrasekar | G01S 19/09 |
| 2006/0234724 A1 * | 10/2006 | Syrjarinne | G04G 5/002 |
| | | | 342/357.62 |
| 2011/0285586 A1 | 11/2011 | Ferguson | |
| 2017/0329016 A1 | 11/2017 | Cruddace et al. | |
| 2018/0011199 A1 | 1/2018 | Lombardi | |
| 2018/0356529 A1 | 12/2018 | Lee et al. | |
| 2021/0072707 A1 | 3/2021 | Hisashima et al. | |

FOREIGN PATENT DOCUMENTS

| | | | | |
|---|---|---|---|---|
| JP | 2007306352 A | * | 11/2007 | H04L 9/32 |
| JP | 2021038965 A | * | 3/2021 | G04G 5/00 |
| JP | 6879235 B2 | * | 6/2021 | G01S 19/21 |
| WO | 2016057458 A1 | | 4/2016 | |
| WO | WO-2023130251 A1 | * | 7/2023 | H04W 56/0045 |

OTHER PUBLICATIONS

Mar. 7, 2022—(GB) Search Report—App 2108229.2.
2020, Unknown, "GNSS User Technology Report Editor's Special on Space Data for Europe" URL: https://www.gsa.europa.eu/sites/default/files/uploads/technology_report_2020.pdf, pp. 80-85.

* cited by examiner

METHOD AND SYSTEM FOR TIME AUTHENTICATION

FIELD

Aspects described herein relate to a method and system for authenticating the time signal that is derivable from a Global Navigation Satellite System (GNSS). In addition, some aspects also relate to the provision or improvement of the precision of timing provided from a GNSS.

BACKGROUND

Satellite Positioning Systems (SPS) are used in many areas, such as providing accurate timing, as well as accurate navigation and positioning for vehicles such as aircraft, cars, ships, and the like. Satellite Positioning systems can be classified as either a Global Navigation Satellite System (GNSS), such as the Global Positioning System (GPS), the Galileo system, the GLONASS system, and the Beidou system which provide global coverage, or as a regional system which just provides regional coverage, such as the Indian Regional Navigation Satellite System or IRNSS with an operational name of NAVIC (Sailor or Navigator in Hindi) system. In this description, however, we often use the term GNSS to refer to any satellite positioning system, whether global or regional, unless the context clearly requires otherwise, and hence the terms Satellite Positioning System (SPS) and Global Navigation Satellite System (GNSS) are often used herein interchangeably.

Whilst many GNSS/SPS systems will provide native accuracy of a few meters, improved accuracy can be obtained by using differential techniques which make use of a surveyed reference GNSS receiver, which compares the position obtained by its GNSS receiver to its known surveyed position, and then broadcasts position correction data to other ground stations, which then use the position correction data in combination with their own position fixes from the GNSS system in order to obtain a more accurate position fix. Such dGNSS systems (referred to herein more generally as dSPS systems to also include where the SPS is a regional system) often have only a single surveyed reference station, and the accuracy of the position fixes obtained by the rover stations decreases with distance from the fixed survey station.

More recently, networks of surveyed reference GNSS receiver stations have been installed across geographical regions. For example, in the UK the "OS Net" network of precisely located GNSS receiver stations provides a national network of reference GNSS stations which can be used to improve the accuracy of position fixes of other mobile stations. In practice, the reference stations at the precisely surveyed geographic locations may use real time kinematic (RTK) satellite navigation techniques, where the phase of the GNSS signal's carrier wave is measured, thereby allowing highly accurate positioning, typically to one to two centimetres accuracy. FIG. 1 illustrates such a network of reference stations, wherein a plurality of reference stations 12 are distributed across a geographic region 1, at precisely surveyed and known geographic locations. The reference stations 12 may use dGNSS or RTK techniques to obtain position fixes, which fixes are then fed back to a central server 30, which collates the position fix data from each reference station 12, and compares it to the known geographic location of each reference station 12, to thereby allow position fix correction data to be computed. A mobile station 20 typically subscribes to a service which allows access to the position fix correction data calculated by the network RTK server 30, and when it is undertaking a position fix, it contacts the network RTK server 30, and receives the position fix correction data. The position fix correction data is then used by the mobile terminal 20 to improve the accuracy of its own position fix that it takes using signals transmitted by the constellation of GNSS satellite 10. The GNSS satellite constellation 10 may be any of satellites belonging to the Galileo, GPS, or GLONASS GNSS, or Beidou or instead of being global may be any of the other regional SPS constellations, such as IRNSS.

With such an arrangement, accurate positioning across the geographical area 1 can be obtained, to sub-meter, centimetre, or even subcentimetre accuracy, depending on the length of time observed and the capability of the user's GNSS equipment. Such accuracy can be very important for surveying applications, as well as for machinery control (e.g. farm machinery), Unmanned Aerial Vehicle operations, asset tracking, and the like.

In addition to providing geographic position fixes, one of the other main uses of GNSS systems is to provide very accurate distributed time base signals that can then be employed in many other systems. For example, various power generation and transmission systems, financial and banking systems, and transport systems, amongst others, make use of the accurate clock signals that are inherent within GNSS signals for their own accurate operation. In fact, the use of the GNSS time base signals from GPS, Galileo or the like in various other systems are one of the primary benefits of such GNSS systems—as well as providing for accurate global positioning such GNSS systems also provide for the global distribution of an accurate time base. Such globally synchronised and accurate time signals are essentially "free-to-use" to other systems that consume such signals, and are one of the main underpinnings of the modern technological world.

However, GNSS systems are themselves owned and operated by individual nation states or groups of states within political unions, and control of such GNSS systems remains with such states. For other countries which do not themselves own and operate such GNSS systems but which depend on the timing signals provided by such for their own critical national infrastructure, the continued availability of accurate timing signals is very important in order to be able to continue to operate such infrastructure. In particular, the ability to detect whether GNSS timing signals are subject to degradation and inaccuracies, whether intentionally on the part of their nation state owner-operators, or due to third party actors who may try to spoof or jam such signals, or even due to natural phenomena such as solar weather, is an important requirement for all users of GNSS timing signals.

Example prior art includes US2018356529A1, which discloses how degradation of a GNSS signal can be detected by switching to another position, navigation and timing (PNT) system, such as LORAN or DME. In this respect, the prior art notes that it is difficult for an adversary to jam or spoof at the same time across different PNT modalities, and hence providing a receiver capable of receiving signals from at least two modalities such as GNSS, LORAN, DME, or the like can address such issues. Such a multi-mode receiver may primarily rely upon data associated with signals of one PNT modality, but may switch to data associated with signals from another PNT modality upon indication that the first data may be corrupt (e.g., from spoofing). In order to detect such corruption, a receiver may monitor the SNR of at least one signal of one of the modalities. An irregular increase in SNR may indicate an attack as a spoofer increases the magnitude of a replica signal in an attempt to steer the receiver away from the authentic signal, as described above. In existing receivers, an attack may cause the receiver to simply cease operations. In contrast, a multi-mode receiver according to aspects described herein may default to another PNT modality and continue operating.

As noted above, however, GNSS timing signals are embedded in many modern systems, and it is not possible to provide all such systems with alternative PNT functionality from another PNT system. Moreover, the alternative PNT systems mentioned in the above prior art are typically legacy systems with limited planned lifetimes, having been generally successfully supplanted by GNSS systems. In addition, whilst the prior art describes the potential for jamming of multiple PNT systems as being unlikely, in reality that is not the case, and broad spectrum jamming and spoofing of multiple PNT systems at the same time is readily possible, and particularly by well-resourced national bodies such as military or intelligence agencies, for example. The broader problem of being able to detect whether GNSS timing signals obtained from GNSS systems owned by other nation states are accurate is therefore still a significant problem.

SUMMARY

Illustrative aspects described herein address the above issue of allowing independent third-party users that are not the operators of GNSS systems to be able to detect whether the timing signals supplied by the GNSS systems are accurate and can be relied upon. In particular, aspects described herein make use of existing networks of precisely surveyed GNSS receivers that are used for dGNSS or RTK positioning techniques to measure GNSS time across a territory or region such as a country. The measured GNSS time base signals from each receiver are then fed back to a collating service, similar to the existing dGNSS/RTK systems, which also receives an accurate time base signal from a trusted, for example terrestrial based, third-party time base supplier. For example, the trusted third-party time base supplier may be a university or national laboratory which runs an atomic clock, or network of such clocks, and which maintains a trusted time base. The accurate time base from the trusted third party time base can be from any trusted time provider, but should not itself be derived from any positional, navigation or timing (PNT) system such as another GNSS system or terrestrial based navigation system such as LORAN that can be subject to the same interference or errors as the GNSS system under test, and nor of course should it be derived from the same GNSS system as that under test. The collating service then compares the GNSS time signals from the network of GNSS receivers with the trusted time base and determines whether the GNSS time signals are accurate when compared to the trusted time base, and if they are not accurate, calculates the error. The determined error can then be used, for example, to warn third party users that the GNSS time signals are not accurate and cannot be relied upon. In further aspects the collating service may also provide the calculated error to users and the necessary correction that needs to be applied to measured GNSS time to obtain an accurate reference time, such as for example, UTC time.

With such arrangements it becomes possible for third party users of GNSS timing signals who do not have control over the GNSS signals themselves to continues to use such GNSS timing signals in their infrastructure and applications, whilst being able to be made aware as to whether the GNSS timing signals are accurate and can be relied upon at any moment in time. In addition, in further aspects it is also possible, once the error in a derived GNSS timing signal is known, to then correct that error so that the timing signal can then continue to be used.

In view of the above, from one aspect there is provided a method of authenticating GNSS timing signals, comprising: receiving respective GNSS timing signals from a network of GNSS receivers at known locations; receiving a trusted time signal from a trusted time signal source, the trusted time signal source generating the trusted time signal based on time measurements that are independent of any GNSS or other positional, navigation or timing (PNT) system timing signals; comparing the respective GNSS timing signals with the trusted time signal, and authenticating at least one of the respective GNSS timing signals as correct if a time indicated by the signal substantially matches a time indicated by the trusted time signal.

For example, in one aspect the trusted time signal source is a UTC server that maintains a time measurement derived from a network of one or more, and preferably a plurality of, ground-based atomic clocks. Such a network of atomic clocks is particularly resistant to remote jamming or spoofing, and provides a reliable timebase against which the GNSS time can be measured.

Further features will be apparent from the appended claims.

BRIEF DESCRIPTION OF THE DRAWINGS

Aspects described herein will now be further described by way of example only and with reference to the accompanying drawings, wherein like reference numerals refer to like parts, and wherein.

DETAILED DESCRIPTION

Figure 1:
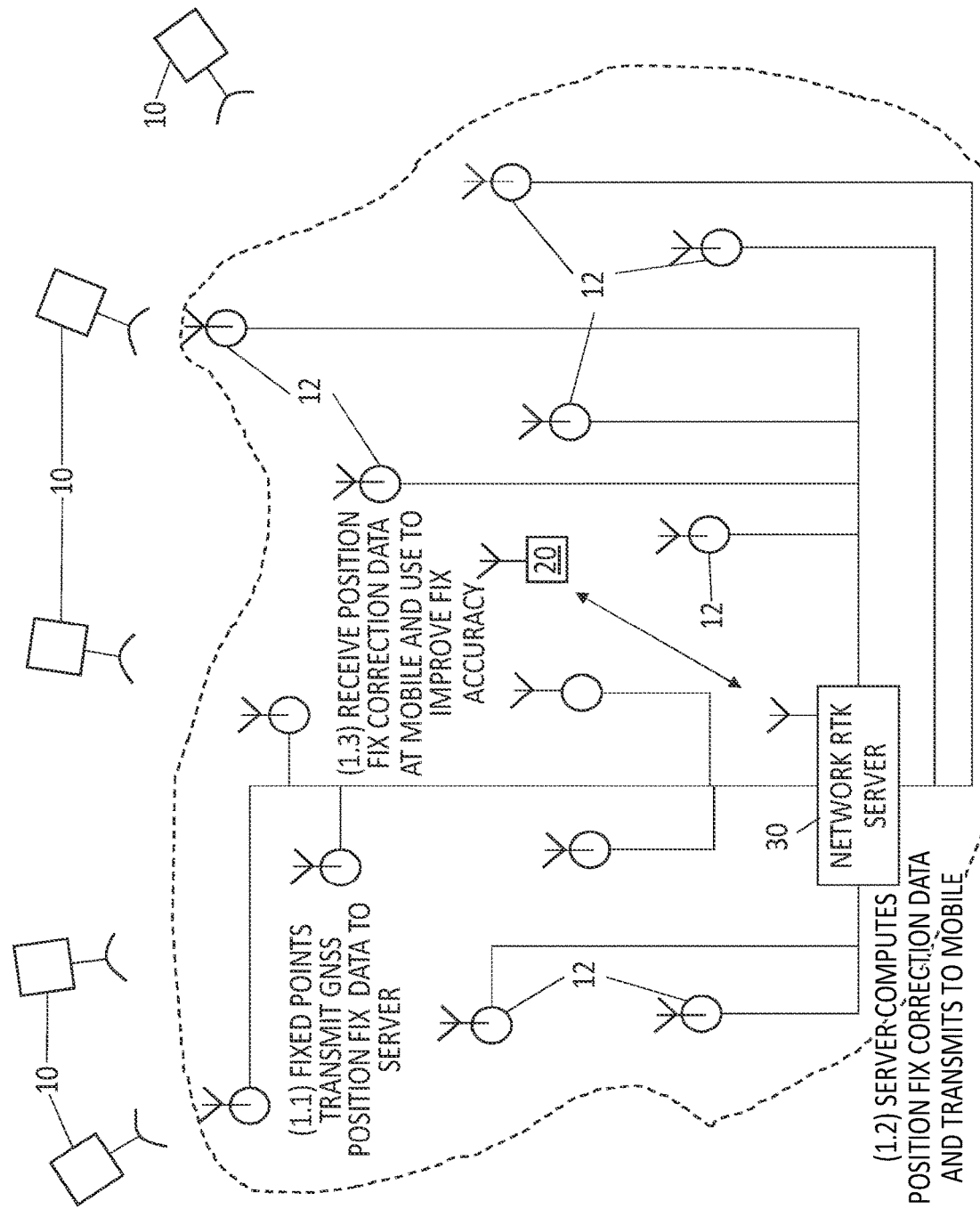
FIG. 1 is diagram of a prior art RTK network for accurate GNSS positioning.

Aspects described herein make use of a network of accurately surveyed GNSS receivers to sample GNSS time and provide it to a server that also receive a trusted time signal from a trusted time base, such as a time base from an atomic clock or network of such clocks maintained by trusted parties, such as universities or government bodies. The presence of a geographically widely distributed network of GNSS receivers, acting as a controlled test and operational environment, presents an excellent opportunity to distribute time information to a high level of accuracy. An existing example of a network of suitable accurately placed GNSS receiver is the "OS Net" network of GNSS receivers, maintained by the present Applicant within the United Kingdom. Although the OS Net is geared towards the distribution of information for highly accurate positioning information, there is a need to extend it to the challenge of providing authoritative and highly accurate timing information. There is also a need for a geographically wide such distribution means. The timing-dependent nature of positioning and the characteristics of the OS Net architecture present great opportunity for OS Net to be the basis, noting that the UK needs such a widely-geographically available timing distribution means. As the demand for resilient position, navigation and timing (PNT) services increase, and as the threats and vulnerabilities evolve, OS Net recognises the need to respond and adapt to the evolving threats and vulnerabilities if it is to continue to support the provision of its core task and support for high accuracy services. As society continues to demand more from digital services, so will its reliance upon those that use and enable PNT, thus OS Net will be suitably placed to support national resilient PNT systems and services.

The location for all OS Net stations is defined using established long term surveying techniques, such that a GNSS based disruption to generation of position from a receiver is detectable. This is the basis for the Real Time Kinematic (RTK) augmentation method which is used to generate correction information for rover (mobile) GNSS receivers, enabling 2 cm real time positioning performance. One critical component for RTK services is the ability for the network to provide station data to the processing stages with low latency, thus OS Net is reliant upon timely access to GNSS data. A key aspect of OS Net is station density, where density is optimised as much as is possible to ensure 2 cm performance with built redundancy to cover station outages. Within the present disclosure the concept of position monitoring and correction data previously applied to RTK services for positioning is instead applied to time. As a time-based technology, it is possible for OS Net to incorporate a time monitoring and thus dissemination capability for a region. In addition, to provide backhaul of measured GNSS time to a central server for processing the incorporation of a fast, low latency, network such as a 5G (or subsequent generation) network with defined timing and synchronisation capabilities would provide a calibration capability between OS Net stations and a central location that is connected to traceable time. In particular the use of a backhaul link that provides for determinable and definable latency (i.e. the time required to transfer the data across the backhaul link(s)) is useful is promoting system reliability.

Figure 2:
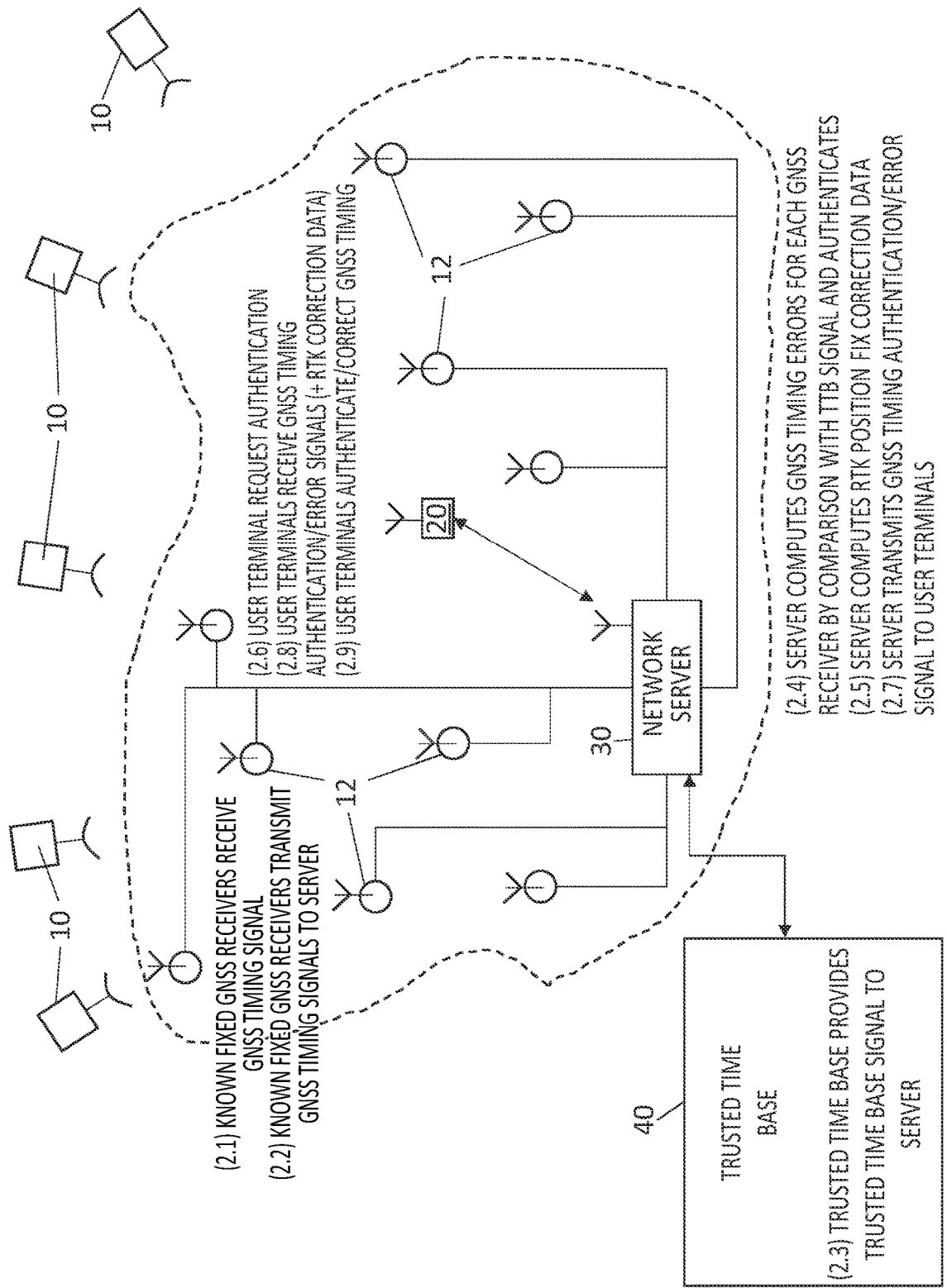
FIG. 2 is a diagram illustrating how a network of GNSS receivers use for and RTK service can be further used in combination with a trusted time base to (at least) detect and (in some cases) correct errors in received GNSS timing signals.

FIG. 2 illustrates the concept in more detail. Here reference GNSS receivers 12 are geographically spread across the region into which a time authentication service is to be provided. The GNSS receivers are in precisely surveyed locations, such that their geographic locations are already precisely known, and can thus be compared with the locations calculated for each from the GNSS signals. The GNSS receivers receive GNSS signals, including GNSS clock time signals from the visible constellation of GNSS satellites 10 overhead in orbit around the Earth.

In order to provide existing RTK positioning correction services the GNSS receivers are logically connected to an RTK network server 30, via respective backhaul connections from each GNSS receiver to the server 30. In addition (or alternatively) to providing RTK services (and hence reporting position fixes and positioning errors) to the server 30, in examples of the present disclosure the GNSS receivers 12 at step 2.1 also receive and decode the GNSS timing signal and determine a GNSS time from the GNSS timing signal. In this respect, each GNSS receiver 12 will respectively determine its own GNSS time from the GNSS timing signals that it receives. Because interference on GNSS signals is temporally and spatially variable each GNSS receiver 12 may determine slightly different respective GNSS times at the same instant in absolute time. At step 2.2 the respective GNSS receivers 12 each transmit their own measurement of GNSS time back to the server 30.

As well as receiving the respective GNSS time measurements from the various GNSS receivers 12, the server 30 also receives a trusted time base signal from a trusted time base source 40, at step 2.3. The trusted time base signal from the trusted third party time base source 40 can be from any trusted time provider which maintains a time system that is independent of any GNSS or other positional, navigation or timing system (PNT) source such as another GNSS system or terrestrial based navigation system such as LORAN. The reason for this is that such other PNT systems can be subject to the same or similar interference or errors as the GNSS system under test, and hence they are incapable within the context of the presently described system of being trusted sufficiently to provide the required authentication. Basically, in trying to authenticate a time signal derived from one PNT system it is not sufficient to use a time signal from another PNT system, whether of a similar operating modality or not, as such systems are capable of suffering the same or similar interference as the PNT system under test.

Instead, as noted previously, the trusted time base signal should be derived from non-PNT systems, and instead should be derived from secure, ground-based timing signals, such as from one or more atomic clocks. As one example, Coordinated Universal Time (UTC) is derived from atomic clocks maintained by around 80 different institutions which is then combined with a measure of solar time from the International Earth Rotation and References Systems Service (IERS) to provide an agreed universal time, with the different atomic clocks then being adjusted once a month in accordance with UTC to maintain the correct, agreed UTC. By way of further example, in the United Kingdom the National Physical Laboratory (NPL) provides a National Timing Centre (NTC) service, which provides an accurate time signal based upon UTC and which is distributed for use across the UK as an accurate time base upon which third parties can rely. Aspects of the present disclosure should use such trusted time base signals that are derived independently from any time signals used in PNT systems, in order to ensure security and authentication, and ultimately trust in the signal.

According to aspects described herein, the server 30 receives such a trusted time base signal from such a trusted time base supplier 40 such as the NTC, and uses the received trusted time base signal to determine whether, and the extent to which, any errors are present in the various measures of GNSS time received from the GNSS receivers 12. That is, at step 2.4 the server 30 computes the GNSS timing errors for each GNSS receiver 12 by comparing the received GNSS time signal with the trusted time based from the trusted time base supplier 40. If the GNSS time from a particular receiver is within an allowable error period of the time indicated by the trusted time base (say of the order of a few tens or hundreds of nano-seconds) then the GNSS time from a particular GNSS terminal is authenticated as being correct and can be relied upon, at least until the next measurement period (which may be, for example, 1 s in the future). The server 30 authenticates the GNSS signals from each of the GNSS receivers 12 in the same way, by comparison of their respective determined GNSS times with the time from the trusted time base service 40.

If the computed time errors are too large, however, then the GNSS time for the particular area in which the GNSS terminal with the error containing signal is located cannot be authenticated. In this case no authentication of the GNSS time for that receiver 12 is possible, and instead the computed error is stored until the next authentication update period. An output message may be provided to the server operator, or stored in a log. Individual service users will be informed if no authentication is possible by an appropriate message when an authentication is attempted, see later.

In addition, where the time authentication service is layered with an RTK positioning service, then further at step 2.5 the server also computes RTK position fix correction data, in a conventional manner.

As noted previously, the interference suffered by GNSS terminals, whether natural or intentional, is spatially and temporally variable, and hence it is necessary to update the authentication of GNSS time regularly. The existing RTK service has an update period of about 1 second, and hence it is also possible to provide GNSS time authentication with an update period which is the same, i.e. about 1 s. This means that the authentication available to the GNSS time at each receiver is valid for each 1 s update period, and then the authentication process is undertaken again for each GNSS terminal.

When a user terminal 20 wants to authenticate the GNSS time that it is receiving, then as in the RTK architecture it contacts the network server 30 at step 2.6 to request the authentication data for the GNSS terminal 12 that it is nearest to, passing its location to the server 30. The server 30 next, at s.2.7, looks up the nearest GNSS terminal and passes the authentication status for the nearest GNSS terminal to the user terminal. In some examples, an authentication status might be derived from the authentication status of the nearest n GNSS terminals for example 2, 3, 5, etc. for example by issuing a positive authentication message to the user terminal if a majority of the n nearest GNSS terminals are able to authenticate the GNSS signals. At step 2.8 the user terminal 20 receives the authentication signal, and if it is a positive authentication, it then knows that it is able to rely on the GNSS timing signals that it is receiving, and hence at s.2.9 then authenticates the received GNSS timing signals.

Conversely, if the user terminal 20 is in an area that is receiving erroneous GNSS timing signals then in response to its request at s.2.6 the server 30 will be unable to reply with an authentication confirmation message. In this case, as an alternative the server 30 may instead pass the computed timing error to the user terminal at s.2.7, which is received by the user terminal at s.2.8, either with or without an appropriate indication of authentication and error status. The user terminal may then try to calculate a corrected GNSS time at s.2.9 using the calculated error. However, given that the update period for the authentication process is of the order of 1 s, the user terminal 20 in this case may wish to simply wait and see if an authenticated GNSS time message can be received instead (although if the interference persists then then ability to calculate an estimated corrected time may be useful).

With respect to the communications channels used between the GNSS receivers 12 and the server 30, and the server 30 and user terminals 20, because of the nature of system fast, low latency and low jitter communications channels are preferable. In this respect, 5G (and future generation) mobile telecoms channels provide such characteristics, and hence are ideal for the backhaul channels between the GNSS receivers 12 and the server 30, and between the server 30 and the user terminals 20.

In terms of the hardware required to implement the above, the user terminals 20 may of course be any GNSS equipped device, such as a mobile phone, dedicated GNSS terminal, GNSS equipped laptop. The GNSS receivers 12 are typically dedicated GNSS receivers, but may also be implemented as software defined radios on general purpose computing devices. The server 30 is typically implemented on a general purpose computing server machine, and likewise the trusted time base 40 would also be implemented on a general purpose computing server machine.

In a further embodiment or aspect, in addition or alternatively to authenticating GNSS time, the GNSS positions computed by the GNSS receivers may also be authenticated, due to the fact that the GNSS receivers are precisely located in known locations. Hence, in a further aspect, when the GNSS receivers feedback their computed GNSS positions from the locally received GNSS signals via the backhaul channels to the server 30, they can also add a "position authentication" flag to the message to indicate to the server 30 that the computed GNSS position matches the already known surveyed position. These flags can then used by the server 30 when undertaking the RTK positioning calculations as part of the RTK service to the users, to add an authentication flag to the RTK output messages sent to the end user terminals 20. That is, if the server 30 is able to use GNSS positioning data from GNSS receivers that have asserted their "position authentication" flag in their backhaul messages to the server 30 in the RTK calculations in response to an end user terminal 20 request, then it is in turn also able to pass on a "position authenticated" flag to a user terminal 20, with the RTK position information. In this way it then becomes possible to layer a position authentication onto the RTK service, which may be used either separately from, or in combination with, the time authentication service described previously.

Various further modifications to the above described aspects, whether by way of addition, deletion or substitution, will be apparent to the skilled person to provide additional aspects, any and all of which are intended to be encompassed by the appended claims.

The invention claimed is:

1. A method of authenticating GNSS timing signals, comprising:
   receiving respective GNSS timing signals from a network of GNSS receivers at known locations;
   receiving a trusted time signal from a trusted time signal source, the trusted time signal source having generated the trusted time signal based on time measurements that are independent of any GNSS or other positional, navigation and timing (PNT) system timing signals;
   comparing the respective GNSS timing signals with the trusted time signal; and
   authenticating at least one of the respective GNSS timing signals as correct if a time indicated by the signal substantially matches a time indicated by the trusted time signal;
   the method further comprising:
   receiving a timing authentication request from a user terminal;
   identifying one or more of the GNSS receivers in the vicinity of the user terminal;
   determining an authentication status of the GNSS timing signals received by the identified GNSS receivers; and
   transmitting an authentication message indicating the determined authentication status to the user terminal.

2. The method according to claim 1, wherein the time indicated by the signal substantially matches the time indicated by the trusted time signal if the time indicated by the signal is within a predetermined error time period of the time indicated by the trusted time signal.

3. The method according to claim 2, wherein the predetermined error time period is no more than 500 nS.

4. The method according to claim 1, wherein the trusted time signal is derived from one or more ground-based atomic clocks.

5. The method according to claim 1, wherein the trusted time signal is a coordinated universal time (UTC) time signal.

6. The method according to claim 5, wherein the channel is an at least fifth generation (5G) mobile telecommunications channel.

7. The method according to claim 1, wherein the trusted time signal is received from the trusted time signal source via a communications channel with definable and measurable latency.

8. The method according to claim 1, wherein the determining step comprises identifying the n nearest GNSS receivers to the user terminal, and determining a composite authentication status from the authentication status of the n GNSS receivers, wherein preferably n is greater than 1.

9. The method according to claim 1, wherein if the authentication status of the GNSS timing signals is such that the GNSS timing signals are not authenticated, then the authentication message further contains a timing error between the GNSS timing signals and the trusted time signal.

10. The method according to claim 1, wherein the network of GNSS receivers are provided as part of an RTK/dGNSS system, the method further comprising providing RTK positioning correction data to user terminals in addition to GNSS timing authentication messages.

11. The method according to claim 1, and further comprising:
receiving GNSS location data from the GNSS receivers at the known locations;
determining if the GNSS location data substantially matches the known locations; and
authenticating at least one of the GNSS location data as correct if the location data substantially matches the known location for the GNSS receiver to which it relates.

12. The method according to claim 11, and further comprising providing the GNSS location data authentication to a user terminal together with RTK positioning correct data.

13. A computer system for authenticating GNSS timing signals, the computer system comprising:
a processor; and
a computer readable storage medium, the computer readable storage medium comprising computer readable instructions that when executed by the processor cause the computer system to operate according to:
receive respective GNSS timing signals from a network of GNSS receivers at known locations;
receive a trusted time signal from a trusted time signal source, the trusted time signal source having generated the trusted time signal based on time measurements that are independent of any GNSS or other positional, navigation and timing (PNT) system timing signals;
compare the respective GNSS timing signals with the trusted time signal; and
authenticate at least one of the respective GNSS timing signals as correct if a time indicated by the signal substantially matches a time indicated by the trusted time signal;
the computer readable instructions when executed by the processor further causing the computer system to operate to:
receive a timing authentication request from a user terminal;
identify one or more of the GNSS receivers in the vicinity of the user terminal;
determine an authentication status of the GNSS timing signals received by the identified GNSS receivers; and
transmit an authentication message indicating the determined authentication status to the user terminal.

14. The system according to claim 13, wherein the time indicated by the signal substantially matches the time indicated by the trusted time signal if the time indicated by the signal is within a predetermined error time period of the time indicated by the trusted time signal.

15. The system according to claim 13, wherein the trusted time signal is derived from one or more ground-based atomic clocks.

16. The system according to claim 13, wherein the trusted time signal is a coordinated universal time (UTC) time signal.

17. The system according to claim 13, wherein the determining step comprises identifying the n nearest GNSS receivers to the user terminal, and determining a composite authentication status from the authentication status of the n GNSS receivers, wherein preferably n is greater than 1.

18. The system according to claim 13, the system being further arranged to operate in use to:
receive GNSS location data from the GNSS receivers at the known locations;
determine if the GNSS location data substantially matches the known locations; and
authenticate at least one of the GNSS location data as correct if the location data substantially matches the known location for the GNSS receiver to which it relates.

* * * * *